(12) United States Patent
Tseng (10) Patent No.: US 10,178,908 B1
(45) Date of Patent: Jan. 15, 2019

(54) STORAGE RACK

(71) Applicant: CHIN JWU ENTERPRISE CO., LTD., Chiayi Hsien (TW)

(72) Inventor: Chun-Hsien Tseng, Chiayi Hsien (TW)

(73) Assignee: CHIN JWU ENTERPRISE CO., LTD., Chiayi Hsien (TW)

( * ) Notice: Subject to any disclaimer, the term of this patent is extended or adjusted under 35 U.S.C. 154(b) by 0 days.

(21) Appl. No.: 16/135,582

(22) Filed: Sep. 19, 2018

(51) Int. Cl.
*A47B 47/00* (2006.01)
*A47B 73/00* (2006.01)
*A47B 87/02* (2006.01)
*A47B 47/02* (2006.01)

(52) U.S. Cl.
CPC ...... *A47B 47/0025* (2013.01); *A47B 47/0008* (2013.01); *A47B 47/0075* (2013.01); *A47B 47/021* (2013.01); *A47B 73/006* (2013.01); *A47B 87/0276* (2013.01)

(58) Field of Classification Search
CPC .............. A47B 73/006; A47B 47/0075; A47B 47/0091; A47B 47/0025
See application file for complete search history.

(56) References Cited

U.S. PATENT DOCUMENTS

| 3,081,023 | A | * | 3/1963 | Taylor | A47G 29/1201 211/10 |
| 3,144,881 | A | * | 8/1964 | Sproull | B03C 3/49 138/117 |
| D236,411 | S | * | 8/1975 | Horney | D6/683 |
| 4,247,011 | A | * | 1/1981 | Walter | A47B 87/0276 211/194 |
| 5,947,305 | A | * | 9/1999 | Lin | A47B 73/006 211/74 |
| 6,209,735 | B1 | * | 4/2001 | Gladstone | A47F 5/10 211/194 |
| 7,604,133 | B2 | * | 10/2009 | Tsai | A47B 73/006 211/189 |
| 8,248,792 | B2 | * | 8/2012 | Wei | H05K 7/20745 181/264 |
| 9,016,485 | B1 | * | 4/2015 | Liu | A47B 47/0075 211/183 |
| 9,175,791 | B2 | * | 11/2015 | McCoy | F16L 3/02 |

(Continued)

FOREIGN PATENT DOCUMENTS

| DE | 9403857 U1 | * | 4/1994 | ......... A47B 87/0276 |
| DE | 29801206 U1 | * | 3/1998 | ........... A47B 73/006 |
| GB | 1604260 A | * | 12/1981 | ........... A47B 73/006 |

*Primary Examiner* — Kimberley S Wright
(74) *Attorney, Agent, or Firm* — Muncy, Geissler, Olds & Lowe, P.C.

(57) ABSTRACT

A hexagon storage rack includes a top wall, a bottom wall, two upper side walls, and two lower side walls. Each upper side wall is inclined and has a main wall portion and at least one protruding portion. Each lower side wall is inclined and has a main wall section and at least one engaging hole formed in the main wall section. The protruding portion has a head segment and a connecting segment having a cross-section which is smaller than that of the head segment. The engaging hole has an extension hole section having a minimum width which is larger than a maximum width of the cross-section of the head segment, and a positioning hole section having a minimum width which is smaller than the maximum width of the cross-section of the head segment.

5 Claims, 7 Drawing Sheets

(56) References Cited

U.S. PATENT DOCUMENTS

| | | | |
|---|---|---|---|
| 2012/0256148 A1* | 10/2012 | Sirotin | E04H 17/16 |
| | | | 256/25 |
| 2015/0076091 A1* | 3/2015 | Lee | A47B 73/006 |
| | | | 211/85.4 |
| 2015/0096954 A1* | 4/2015 | Liu | A47B 47/0066 |
| | | | 211/186 |
| 2017/0321734 A1* | 11/2017 | Maertens | F16B 12/12 |
| 2018/0146776 A1* | 5/2018 | Lye | A47B 47/0091 |

* cited by examiner

STORAGE RACK

FIELD

The disclosure relates to a rack, and more particularly to a storage rack and its assembly.

BACKGROUND

A storage rack is a common household or office furniture. It may come in different shapes, such as a circle, a square or other polygons, etc. When a plurality of storage racks with the same shape is assembled, the assembly may resemble real life objects. The assembly of a plurality of hexagonal storage racks, for instance, bears resemblance to the structure of a honeycomb which is popular among consumers. However, extra components, such as screws or other connecting members, are required to join and secure the hexagonal storage racks to each other. The additional and large quantities of loose components needed may cause inconvenience during assembly and/or disassembly of the plurality of storage racks.

SUMMARY

Therefore, an object of the disclosure is to provide a storage rack that can alleviate at least one of the drawbacks of the prior art.

Accordingly, the storage rack includes a horizontal top wall having horizontally opposite ends, a horizontal bottom wall disposed under the top wall and having horizontally opposite ends, two upper side walls, and two lower side walls.

Each of the two upper side walls is inclined and has a main wall portion and at least one protruding portion. The main wall portion of each of the two upper side walls has a top end connected to a respective one of the opposite ends of the top wall, and a bottom end disposed below the top end. A distance between the main wall portions of the upper side walls in the left-right direction gradually increases in a vertical direction away from the top wall. The at least one protruding portion protrudes outwardly from the main wall portion, and has ahead segment and a connecting segment. The head segment is spaced apart from the upper side wall. The connecting segment interconnects the head segment and the upper side wall, and has a cross-section which is smaller than that of the head segment.

Each of the two lower side walls is inclined and has a main wall portion and at least one engaging hole. The main wall portion of each of the lower side walls has a bottom end connected to a respective one of the opposite ends of the bottom wall, and a top end disposed above the bottom end and connected to the bottom end of a respective one of the upper side walls. A distance between the main wall portions of the lower side walls in the left-right direction gradually decreases in the vertical direction away from the top wall. The at least one engaging hole is formed in the main wall portion of the lower side wall, is adapted to be engaged with at least one protruding portion of another one of the storage rack, and has an extension hole section and a positioning hole section. The extension hole section has a minimum width which is larger than a maximum width of the cross-section of the head segment of the at least one protruding portion of the another one of the storage rack extending therethrough. The positioning hole section extends upwardly from the extension hole section, and has a minimum width which is smaller than the maximum width of the cross-section of the head segment of the at least one protruding portion and which is larger than the maximum width of the cross-section of the connecting segment of the at least one protruding portion.

Another object of the disclosure is to provide a storage rack assembly that can alleviate at least one of the drawbacks of the prior art.

Accordingly, the storage rack assembly includes a first storage rack and a second storage rack. Each of the first and second storage racks includes a horizontal top wall, a horizontal bottom wall, two upper side walls, and two lower side walls. The horizontal top wall has horizontally opposite ends. The horizontal bottom wall is disposed under the top wall and has horizontally opposite ends.

Each of the upper side walls is inclined and has a main wall portion and at least one protruding portion. The main wall portion has a top end connected to a respective one of the opposite ends of the top wall, and a bottom end disposed below the top end. A distance between the main wall portions of the upper side walls in the left-right direction gradually increasing in a vertical direction away from the top wall. The at least one protruding portion protrudes outwardly from the main wall portion, and has a head segment and a connecting segment. The head segment is spaced apart from the upper side wall. The connecting segment interconnects the head segment and the upper side wall, and has a cross-section which is smaller than that of the head segment.

Each of the lower side walls is inclined and has a main wall portion and at least one engaging hole. The main wall portion of each of the lower side walls has a bottom end connected to a respective one of the opposite ends of the bottom wall, and a top end disposed above the bottom end and connected to the bottom end of a respective one of the upper side walls. A distance between the main wall portions of the lower side walls in the left-right direction gradually decreasing in the vertical direction away from the top wall. The at least one engaging hole is formed in the main wall portion of the lower side wall, and has an extension hole section and a positioning hole section. The extension hole section has a minimum width which is larger than a maximum width of the cross-section of the head segment of the at least one protruding portion of each of the upper side walls of the first and second storage racks. The positioning hole section extends upwardly from the extension hole section and has a minimum width which is smaller than the maximum width of the cross-section of the head segment of the at least one protruding portion of each of the upper side walls of the first and second storage racks and which is larger than the maximum width of the cross-section of the connecting segment of the at least one protruding portion of each of the upper side walls of the first and second storage racks.

One of the lower side walls of the second storage rack contacts one of the upper side walls of the first storage rack with the at least one protruding portion of one of the upper side walls of the first storage rack engaging the at least one engaging hole of the one of the lower side walls of the second storage rack.

The connecting segment of the at least one protruding portion of the one of the upper side walls of the first storage rack extends through the at least one engaging hole of the one of the lower side walls of the second storage rack.

The second storage rack is movable relative to the first storage rack after extension of the head segment of the at least one protruding portion of the one of the upper side walls of the first storage rack through the extension hole section of the at least one engaging hole of the one of the lower side walls of the second storage rack to engage the connecting segment of the at least one protruding portion of the one of the upper side walls of the first storage rack with the positioning hole section of the at least one engaging hole of the one of the lower side walls of the second storage rack.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
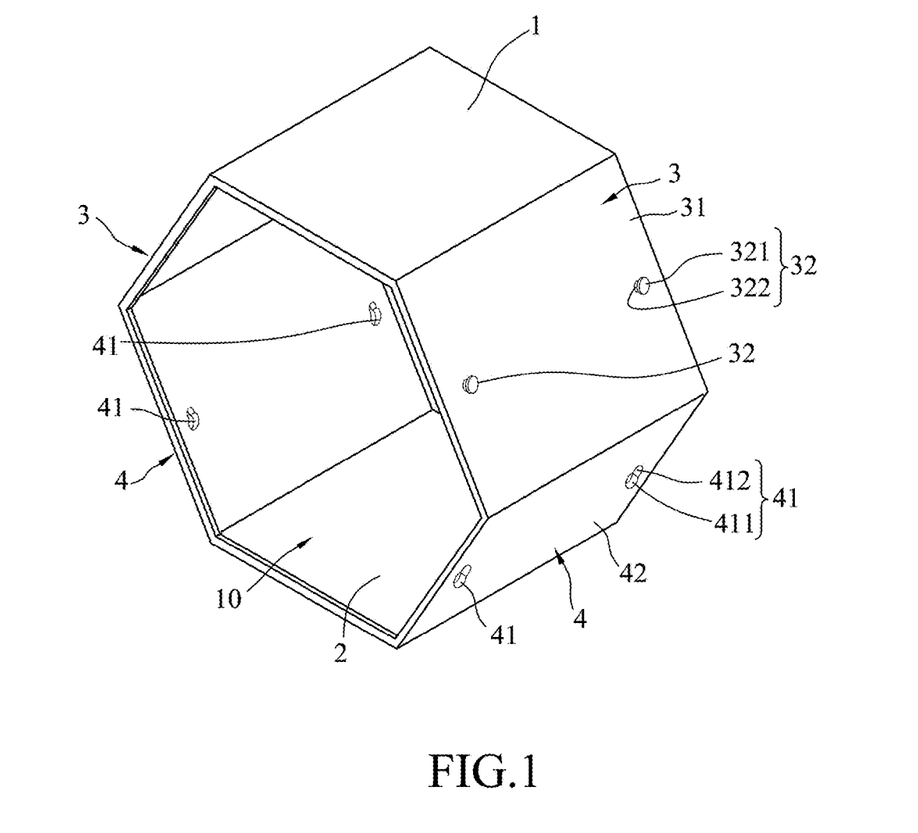
FIG. 1 is a perspective view of an embodiment of a storage rack according to the disclosure.
Figure 2:
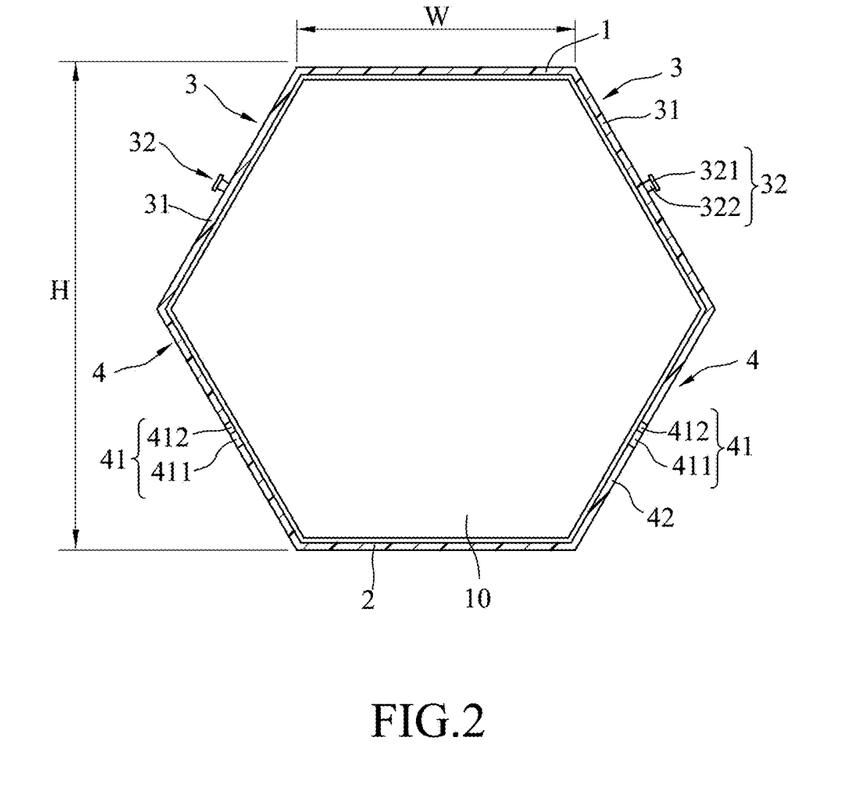
FIG. 2 is a sectional view of the embodiment.
Figure 3:
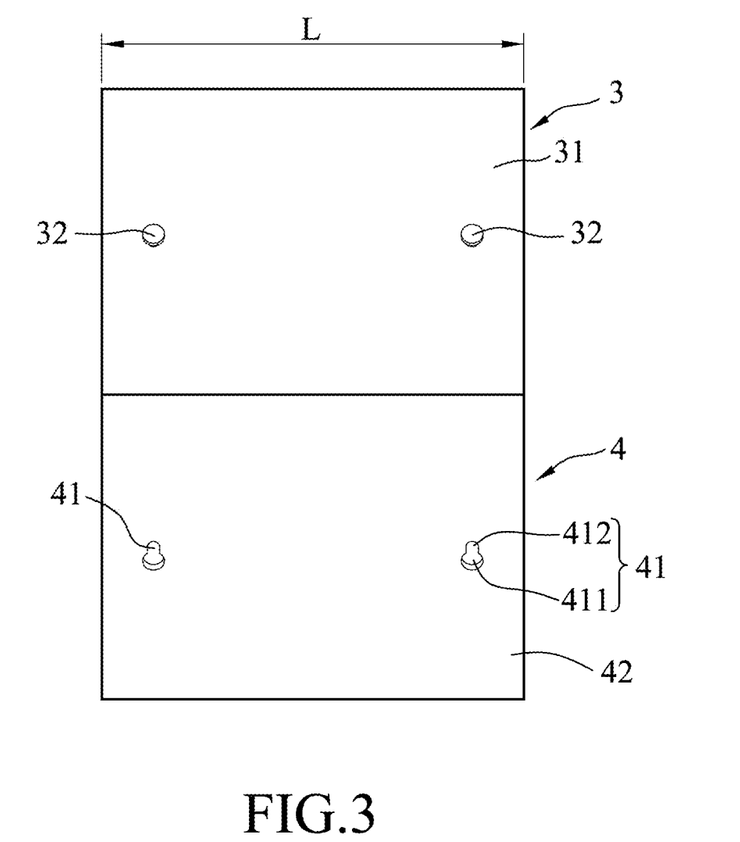
FIG. 3 is a side view of the embodiment.

As shown in FIGS. 1 to 3, an embodiment of the storage rack according to the disclosure is in the shape of a hexagon that defines a storage space 10. The storage rack includes a horizontal top wall 1 having horizontally opposite ends, a horizontal bottom wall 2 disposed under the top wall 1 and having horizontally opposite ends, two upper side walls 3, and two lower side walls 4.

The bottom wall 2 may be placed on a flat surface such as the floor or the top of a table.

The top wall 1, the bottom wall 2, the two upper side walls 3, and the two lower side walls 4 cooperatively define the storage space 10.

In this embodiment, each of the upper side walls 3 is inclined, and has a main wall portion 31 and two protruding portions 32 spaced apart from each other. The main wall portion 31 has a top end connected to a respective one of the opposite ends of the top wall, and a bottom end disposed below the top end. A distance between the main wall portions 31 of the upper side walls 3 in the left-right direction gradually increases in a vertical direction away from the top wall 1. In this embodiment, the protruding portions 32 are made of metal. For each upper side wall 3, each of the protruding portions 32 protrudes outwardly from the main wall portion 31. Each protruding portion 32 has a head segment 321 that is spaced apart from the upper side wall 3, and a connecting segment 322 that interconnects the head segment 321 and the upper sidewall 3. The connecting segment 322 has a cross-section smaller than that of the head segment 321.

In this embodiment, each of the two lower side walls 4 is inclined, and has a main wall section 42 and two engaging holes 41 formed in the main wall section 42 and spaced apart from each other. The main wall section 42 has a bottom end connected to a respective one of the opposite ends of the bottom wall 2, and a top end disposed above the bottom end and connected to the bottom end of a respective one of the upper side walls 3. A distance between the main wall sections 42 of the lower side walls 4 in the left-right direction gradually decreases in the vertical direction away from the top wall 1. Each of the engaging holes 41 is adapted to be engaged with a corresponding protruding portion 32 of another one of the storage rack, and has an extension hole section 411 and a positioning hole section 412. The extension hole section 411 has a minimum width larger than a maximum width of the cross-section of the head segment 321 of each protruding portion 32 for extension of the head segment 321 of the corresponding protruding portion 32 of the another one of the storage rack therethrough. The positioning hole section 412 extends upwardly from the extension hole section 411, and has a minimum width smaller than the maximum width of the cross-section of the head segment 321 of each protruding portion 32 and larger than the maximum width of the cross-section of the connecting segment 322 of each protruding portion 32.

In the present embodiment, the storage rack has a front-back length (L) of 25.5 centimeters, and an overall height (H) of 39.7 centimeters. The top wall 1 and the bottom wall 2 share the same left-right length (W) of 23 centimeters. These dimensions are for exemplary purposes only and should not be treated as limitations of the disclosure.

Figure 4:
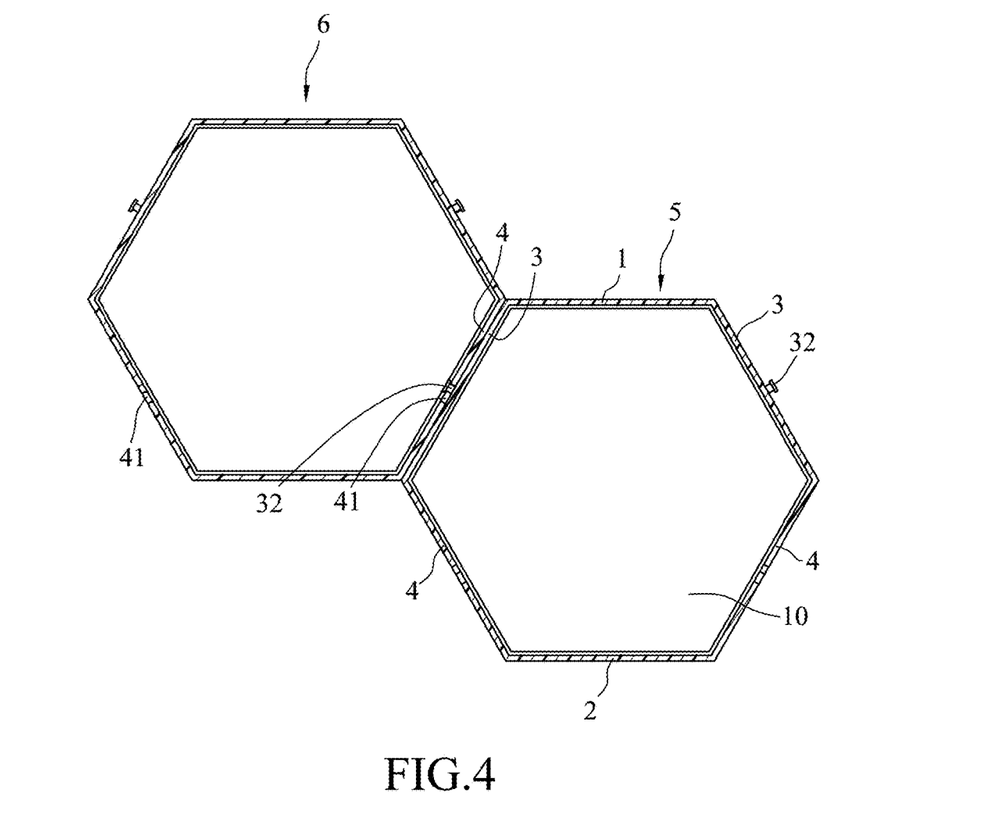
FIG. 4 is a sectional view illustrating two of the embodiments that are assembled together.
Figure 5:
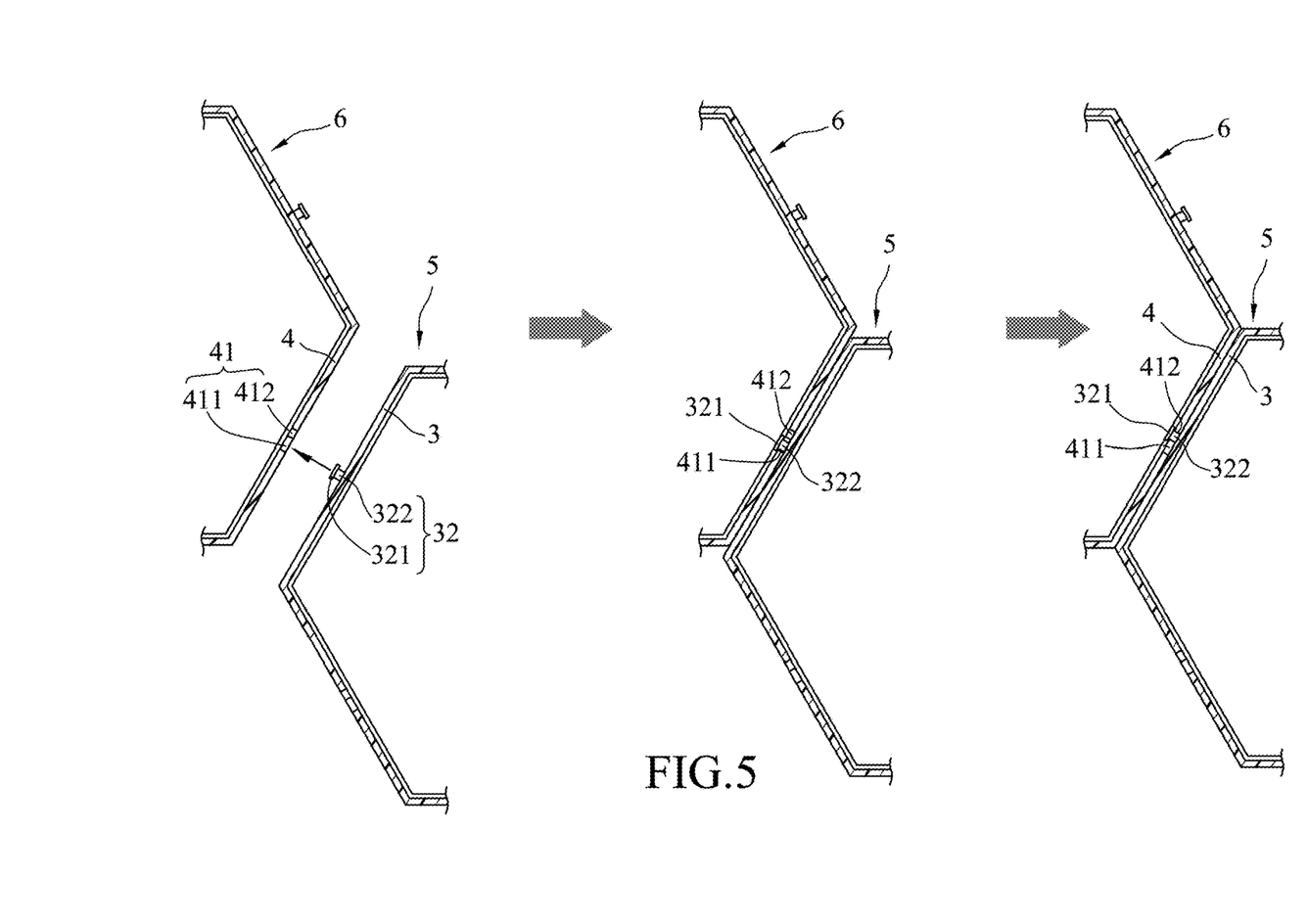
FIG. 5 is a fragmentary sectional view illustrating the assembly process of the two embodiments shown in FIG. 4.

During use, the storage rack may be used alone or combined with another or more storage racks to form a storage rack assembly. As shown in FIGS. 4 and 5, an embodiment of the storage rack assembly includes two of the abovementioned storage racks. For the sake of explanation, the two storage racks are named first storage rack 5 and second storage rack 6, respectively.

To assemble the first and second storage racks 5, 6, one of the lower side walls 4 of the second storage rack 6 contacts one of the upper side walls 3 of the first storage rack 5, with the two protruding portions 32 of the one of the upper side walls 3 of the first storage rack 5 engaging respectively the two engaging holes 41 of the one of the lower the walls 4 of the second storage rack 6.

More specifically, during assembly, a user moves one of the lower side walls 4 of the second storage rack 6 close to one of the upper side walls 3 of the first storage rack 5. As the connecting segments 322 of the protruding portions 32 of the one of the upper side walls 3 of the first storage rack 5 go respectively through the extension hole sections 411 of the engaging holes 41 of the one of the lower side walls 4 of the second storage rack 6, the user may slightly release his/her hold of the second storage rack 6. This allows the second storage rack 6 to slightly slide down against the one of the upper side walls 3 of the first storage rack 5 by virtue of gravity. Consequently, the connecting segments 322 of the protruding portions 32 of the one of the upper side walls 3 of the first storage rack 5 then engage respectively the positioning hole sections 412 of the engaging holes 41 of the one of the lower side walls 4 of the second storage rack 6, and the head segments 322 of the protruding portions 32 of the one of the upper side walls 3 of the first storage rack 5 abut against an inner surface of the one of the lower side walls 4 of the second storage rack 6. At this time, the assembly of the first and second storage racks 5, 6, is complete. The user may place heavy items in the first storage rack 5, i.e., the lower of the two storage racks, as illustrated in FIG. 4, to make the storage rack assembly more sturdy and stable.

To disassemble the first and second storage racks 5, 6, the user only needs to reverse the abovementioned process, i.e., to slightly lift up the second storage rack 6 to make the connecting segments 322 of the protruding portions 32 of the one of the upper side walls 3 of the first storage rack 5 engage respectively the extension hole sections 411 of the engaging holes 41 of the one of the lower side walls 4 of the second storage rack 6. The head segments 321 of the protruding portions 32 of the one of the upper side walls 3 of the first storage rack 5 are then free to move out of the extension hole sections 411 of the engaging holes 41 of the one of the lower side walls 4 of the second storage rack 6, respectively. Afterward, the user can move the second storage rack 6 in a direction away from the first storage rack 5 to complete the process of disassembly. Therefore, it is fast and easy to complete both the assembly and disassembly of the storage rack assembly of the present disclosure.

Figure 6:
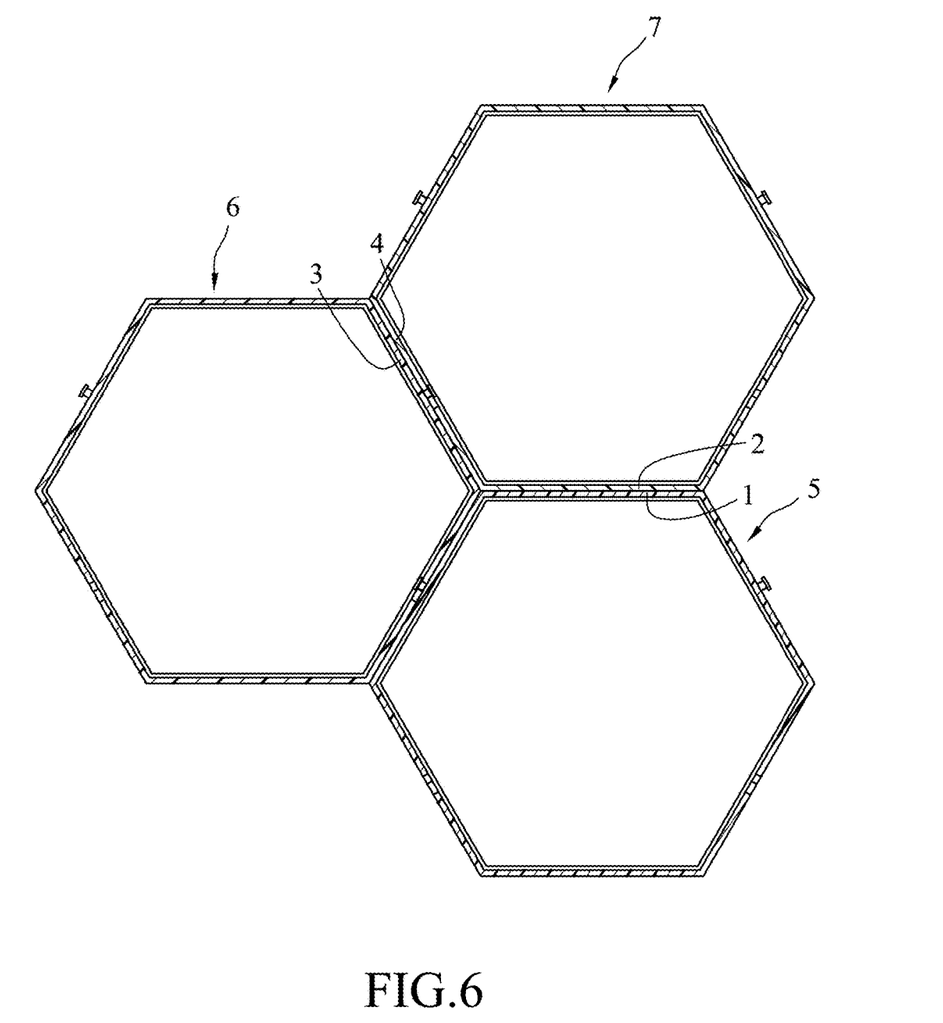
FIG. 6 is a sectional view illustrating three of the embodiments that are assembled together.

As shown in FIG. 6, the storage rack assembly also may include a total of three storage racks to form a honeycomb structure. In other words, a third storage rack 7 is added to the structure as illustrated in FIG. 4. The third storage rack 7 may be assembled onto the second storage rack 6 in the same manner as the assembly of the second storage rack 6 onto the first storage rack 5. When the assembly is complete, one of the lower side walls 4 of the third storage rack 7 contacts one of the upper side walls 3 of the second storage rack 6, and the bottom wall 2 of the third storage rack 7 contacts the top wall 1 of the first storage rack 5 horizontally, forming a sturdy and stable assembly.

Figure 7:
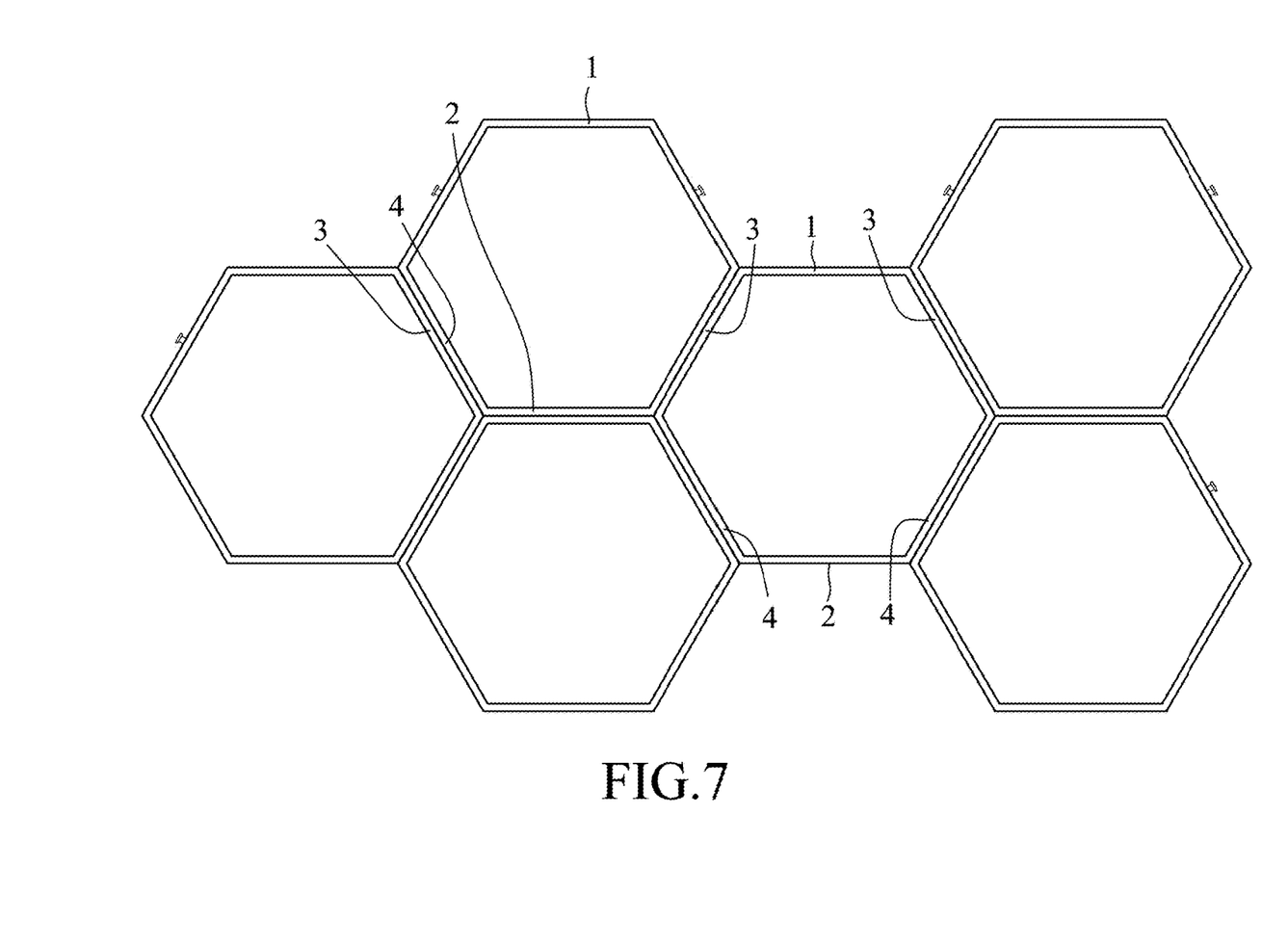
FIG. 7 is a front view illustrating six of the embodiments that are assembled together.

As shown in FIG. 7, the storage rack assembly according to the disclosure also may include a total of six storage racks. This configuration is presented for exemplary purposes only and should not be treated as a limitation of the disclosure. A user may increase the quantity of the storage rack as needed, and assemble the storage racks into desired arrangement.

In addition, the upper side walls 3 and the lower side walls 4 of each storage rack share the same inclination, so each of the upper side walls 3 of one storage rack is able to lean fully against one of the lower side walls 4 of another storage rack. Since each of the storage racks has two upper side walls 3 and two lower side walls 4, each of the storage rack is able to be assembled with up to four other storage racks (as shown in FIG. 7). Furthermore, since each of the storage rack has a horizontal bottom wall 2 and a horizontal top wall 1, each of the storage racks is able to be placed on top of another storage rack, a desk, or the floor, or accommodate another storage rack on top thereof, thus forming a sturdy and stable assembly.

In summary, the advantages of the disclosure are as follows:

By engaging the protruding portions 32 of one of the upper side walls 3 of one storage rack with the engaging holes 41 of one of the lower side walls 4 of another storage rack, a user may assemble a plurality of the storage racks fast and easily.

In addition, there are no loose components in the disclosure, and the quantity of the component is minimized.

Moreover, to disassemble the storage rack assembly, a user needs only to slightly lift up the upper storage rack and disengage the protruding portions 32 with the corresponding engaging holes 41, and thus accomplish the disassembling process, fast and easily.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A storage rack comprising:
a horizontal top wall having horizontally opposite ends;
a horizontal bottom wall disposed under said top wall and having horizontally opposite ends;
two upper side walls, each being inclined and having
a main wall portion that has a top end connected to a respective one of said opposite ends of said top wall, and a bottom end disposed below said top end, a distance between said main wall portions of said upper side walls in the left-right direction gradually increasing in a vertical direction away from said top wall, and
at least one protruding portion that protrudes outwardly from said main wall portion, and that has
a head segment spaced apart from said upper side wall, and
a connecting segment interconnecting said head segment and said upper side wall, and having a cross-section which is smaller than that of said head segment; and
two lower side walls, each being inclined and having
a main wall section that has a bottom end connected to a respective one of said opposite ends of said bottom wall, and a top end disposed above said bottom end and connected to said bottom end of a respective one of said upper side walls, a distance between said main wall sections of said lower side walls in the left-right direction gradually decreasing in the vertical direction away from said top wall, and
at least one engaging hole that is formed in said main wall section, that is adapted to be engaged with at least one protruding portion of another one of the storage rack, and that has
an extension hole section having a minimum width which is larger than a maximum width of the cross-section of said head segment of said at least one protruding portion for extension of the head segment of the at least one protruding portion of the another one of the storage rack therethrough, and
a positioning hole section extending upwardly from said extension hole section, and having a minimum width which is smaller than the maximum width of the cross-section of said head segment of said at least one protruding portion and which is larger than the maximum width of the cross-section of said connecting segment of said at least one protruding portion.

2. The storage rack as claimed in claim 1, wherein each of said upper side walls has two of said protruding portions spaced apart from each other, and each of said lower side walls has two of said engaging holes spaced apart from each other.

3. A storage rack assembly comprising a first storage rack and a second storage rack, each of said first and second storage racks comprising:
   a horizontal top wall having horizontally opposite ends;
   a horizontal bottom wall disposed under said top wall and having horizontally opposite ends;
   two upper side walls, each being inclined and having
      a main wall portion that has a top end connected to a respective one of said opposite ends of said top wall, and a bottom end disposed below said top end, a distance between said main wall portions of said upper side walls in the left-right direction gradually increasing in a vertical direction away from said top wall, and
      at least one protruding portion that protrudes outwardly from said main wall portion, and that has
         a head segment spaced apart from said upper side wall, and
         a connecting segment interconnecting said head segment and said upper side wall, and having a cross-section which is smaller than that of said head segment; and
   two lower side walls, each being inclined and having
      a main wall section that has a bottom end connected to a respective one of said opposite ends of said bottom wall, and a top end disposed above said bottom end and connected to said bottom end of a respective one of said upper side walls, a distance between said main wall sections of said lower side walls in the left-right direction gradually decreasing in the vertical direction away from said top wall, and
      at least one engaging hole that is formed in said main wall section, and that has
         an extension hole section having a minimum width which is larger than a maximum width of the cross-section of said head segment of said at least one protruding portion of each of said upper side walls of said first and second storage racks, and
         a positioning hole section extending upwardly from said extension hole section, and having a minimum width which is smaller than the maximum width of the cross-section of said head segment of said at least one protruding portion of each of said upper side walls of said first and second storage racks and which is larger than the maximum width of the cross-section of said connecting segment of said at least one protruding portion of each of said upper side walls of said first and second storage racks;
   wherein one of said lower side walls of said second storage rack contacts one of said upper side walls of said first storage rack with said at least one protruding portion of said one of said upper side walls of said first storage rack engaging said at least one engaging hole of said one of said lower side walls of said second storage rack;
   wherein said connecting segment of said at least one protruding portion of said one of said upper side walls of said first storage rack extends through said at least one engaging hole of said one of said lower side walls of said second storage rack; and
   wherein said second storage rack is movable relative to said first storage rack after extension of said head segment of said at least one protruding portion of said one of said upper side walls of said first storage rack through said extension hole section of said at least one engaging hole of said one of said lower side walls of said second storage rack to engage said connecting segment of said at least one protruding portion of said one of said upper side walls of said first storage rack with said positioning hole section of said at least one engaging hole of said one of said lower side walls of said second storage rack.

4. The storage rack assembly as claimed in claim 3, wherein said head segment of said at least one protruding portion of said one of said upper side walls of said first storage rack abuts against an inner surface of said one of said lower side walls of said second storage rack.

5. The storage rack assembly as claimed in claim 3, wherein each of said upper side walls of said first and second storage racks has two of said protruding portions spaced apart from each other, and each of said lower side walls of said first and second storage racks has two of said engaging holes spaced apart from each other.

* * * * *